United States Patent [19]

Andre et al.

US005173296A

[11] Patent Number: 5,173,296
[45] Date of Patent: Dec. 22, 1992

[54] COMPOSITIONS CONTAINING PSYLLIUM

[75] Inventors: James R. Andre; John A. Colliopoulos, both of Cincinnati, Ohio

[73] Assignee: The Procter & Gamble Company, Cincinnati, Ohio

[21] Appl. No.: 857,688

[22] Filed: Mar. 25, 1992

Related U.S. Application Data

[63] Continuation of Ser. No. 614,655, Nov. 16, 1990, abandoned.

[51] Int. Cl.⁵ .................. A61K 35/78; A23G 3/00; A23L 1/36
[52] U.S. Cl. .................. 424/195.1; 426/93; 426/103; 426/660
[58] Field of Search ............... 424/195.1; 426/93, 103, 426/660

[56] References Cited

U.S. PATENT DOCUMENTS

| | | | |
|---|---|---|---|
| 906,709 | 12/1908 | Heintz | 424/195.1 |
| 4,668,519 | 5/1987 | Dartey | 426/548 |
| 4,766,004 | 8/1988 | Moskowitz | 426/658 |
| 4,778,676 | 10/1988 | Yang | 424/79 |
| 4,871,557 | 10/1989 | Linscott | 426/93 |
| 4,981,698 | 1/1991 | Cherukuri | 426/5 |

FOREIGN PATENT DOCUMENTS

| | | |
|---|---|---|
| 0144644 | 6/1985 | European Pat. Off. . |
| 0166825 | 1/1986 | European Pat. Off. . |
| 0253763 | 1/1988 | European Pat. Off. ............ 426/572 |
| 0306469 | 3/1989 | European Pat. Off. . |
| 0412604 | 2/1991 | European Pat. Off. . |

OTHER PUBLICATIONS

Erasmus, Udo Fat and Oils 1986 by Alive Vancouver Canada p. 204.
Eat'n Lose ® (Peanut Butter) Nutrition Bars, distributed by CCA Industries, Inc.

*Primary Examiner*—Ronald W. Griffin
*Assistant Examiner*—Ralph Gitomer
*Attorney, Agent, or Firm*—Kim W. Zerby; Douglas C. Mohl; Jack D. Schaeffer

[57] ABSTRACT

The present invention relates to marzipan-like compositions comprising psyllium fiber and almond paste, and the use of these compositions as laxatives and/or for cholesterol reduction benefits. The compositions are a convenient, portable, highly palatable, and well tolerated dosage form for administering psyllium fiber.

12 Claims, No Drawings

COMPOSITIONS CONTAINING PSYLLIUM

This is a continuation of application Ser. No. 07/614,655 filed Nov. 16, 1990, now abandoned.

BACKGROUND OF THE INVENTION

The present invention relates to novel marzipan-like compositions containing psyllium. These compositions essentially comprise psyllium and almond paste. The compositions have excellent texture, mouthfeel and palatability, and are well tolerated by the gastrointestinal tract. They are useful as dietary aids in the control of bowel function (including use as laxatives) and/or for reducing blood cholesterol levels and/or for weight control or other indications where fiber may be beneficial.

Several U.S. patents describe non-baked compositions in which psyllium is an optional or essential ingredient: U.S. Pat. No. 4,778,676, to Yang et al., issued Oct. 18, 1988 (describes chewable compositions comprising a precoated active and a confectionery matrix); U.S. Pat. No. 4,766,004, to Moskowitz, issued Aug. 23, 1988 (describes dietary fiber supplement compositions comprising whole psyllium husks having a particle size of from 12 to 70 mesh, food grade vegetable fat which is a solid at room temperature, sweetening agent and flavoring agent); U.S. Pat. No. 4,737,364, to Kalogris, issued Apr. 12, 1988 (describes low calorie dry food concentrate); U.S. Pat. No. 4,698,232, to Sheu et al., issued Oct. 6, 1987 (describes fiber-containing confectionery compositions comprising dietary fiber pretreated with a lubricant, a foamed matrix, and an amorphous matrix); and U.S. Pat. No. 4,551,331, to Rudin, issued Nov. 5, 1985 and R.E. 32,811, issued Dec. 27, 1988 (describe dietary fiber products comprising a dietary fiber coated with a food grade emulsifier). Naturacil® (sold by Mead Johnson) is an artificial chocolate flavored, caramel-like laxative product containing psyllium; the ingredients listed for this product include sugar, glycerin, nonfat milk, and partially hydrogenated vegetable oil.

U.S. Pat. No. 4,784,861, to Gori, issued Nov. 15, 1988, describes powders formed of a mixture of oat, wheat and corn bran mixed with pectin, guar gum, psyllium and cutin to which mineral supplements have been added. U.S. Pat. No. 4,619,831, to Sharma, issued Oct. 28, 1986, describes dietary fiber products comprising insoluble dietary fiber (92-98.5%) coated or enrobed with soluble dietary fiber (1.5-8%; psyllium is mentioned as one of many soluble fibers). U.S. Pat. No. 4,565,702, to Morley et al., issued Jan. 21, 1986, describes dietary fiber compositions comprising dietary fibers which are insoluble fibers coated with soluble fiber. U.S. Pat. No. 4,348,379, to Kowalsky et al., issued Sept. 7, 1982, describes dietetic compositions comprising psyllium seed, linseed, and wheat bran. European Patent Application Publication No. 144,644, published Jun. 19, 1985 by G. D. Searle and Co., describes high fiber food compositions comprising psyllium and other dietary fiber sources.

West German Patent Specification 2,430,509, published Jan. 15, 1976 by Hypolab S.A., Genf. (Schweiz), describes preparing compositions containing bulk laxatives (including psyllium mucilloid) in the form of a cake. The cake dough is prepared and baked in molds to produce cakes having thickness of 3-6 mm.

Reduced calorie baked cookies containing microcrystalline cellulose as a preferred bulking agent are disclosed in U.S. Pat. No. 4,668,519, to Dartey et al., issued May 26, 1987. This patent indicates that these cookies can optionally include bulking agents such as dietary fibers (including psyllium fiber) at levels up to about 10% by weight of the dough.

Great Britain Patent Specification 1,590,507, published Jun. 3, 1981, by Syntex (U.S.A.) Inc., describes compositions comprising mixtures of purified cellulose and pectin as a source of dietary fiber. The effectiveness of these compositions for controlling fecal output in humans is compared versus various other compositions, including biscuits which comprise only psyllium.

Other documents include: U.S. Pat. No. 4,321,263, to Powell et al., issued Mar. 23, 1982; U.S. Pat. No. 4,511,561, to Madaus et al., issued Apr. 16, 1985; U.S. Pat. No. 3,148,114, to Fahrenbach et al., issued Sept. 8, 1964; U.S. Pat. No. 4,639,367, to Mackles, issued Jan. 27, 1987; Goodman & Gilman, The Pharmacologic Basis of Therapeutics, Sixth Edition, 1004 and 1007 (1980); Garvin et al., *Proc. Soc. Exo. Biol. Med.*, 120, 744-746 (1965); Forman et al.,*Proc. Soc. Exp. Biol. Med.*, 127, 1060-1063 (1968); Anderson et al., *Fed. Proc.*, 46. 877 (1987); Anderson et al., *Am. J. Gastroenterol.*, 81, 907-919 (1986); and Faberberg, *Curr. Ther. Res.*, 31, 166 (1982).

In spite of the large amount of research aimed at developing portable and palatable compositions containing psyllium, there is a continuing need to provide compositions having psyllium at levels high enough to provide therapeutic benefits in reasonably sized, portable compositions having good eating aesthetics and/or tolerance by the gastrointestinal tract. It has been discovered that such compositions can be prepared in the form of a marzipan-like composition comprising psyllium and almond paste. It has also been discovered that such compositions greatly enhance the eating quality and aesthetics for psyllium fiber, especially with regard to the stickiness of the composition (i.e., the tendency of the composition to stick to and/or form an unpleasant coating on the teeth and/or impaction in teeth during ingestion). Furthermore, such compositions are well tolerated by the gastrointestinal tract.

It is an object of the present invention to provide compositions which are convenient, portable and highly palatable (e.g., having excellent texture and mouthfeel) psyllium-containing marzipan-like compositions. An object of the present invention is also to provide convenient, portable psyllium-containing compositions having good consumer acceptance to promote compliance with a regimen for providing laxation benefits and/or reducing serum cholesterol levels. A further object is to provide psyllium-containing compositions having little or no gummy or rubbery texture and reduced stickiness during ingestion. Also, an object is to provide portable psyllium-containing compositions which may comprise high concentrations of psyllium fiber and which are efficacious for providing laxation benefits and/or reducing serum cholesterol levels.

These and other obJects of the present invention will become readily apparent from the detailed description which follows.

All percentages and ratios used herein are by weight unless otherwise specified, and all measurements are made at 25.C unless otherwise specified.

SUMMARY OF THE INVENTION

The present invention relates to highly palatable marzipan-like psyllium-containing compositions. These compositions comprise: from about 5% to about 50% psyllium fiber; from about 10% to about 50% almond paste; and from about 0% to about 85% carrier materials suitable for ingestion. Furthermore, the compositions preferably have water activities ("Aw") within the range of from about 0.25 to about 0.75.

The present invention further relates to methods for reducing serum cholesterol levels, and for providing laxation and regulating bowel function. These methods comprise orally administering to a human in need of such treatment a safe and effective amount of a psyllium-containing composition of the present invention.

DETAILED DESCRIPTION OF THE INVENTION

Psyllium Containing Compositions

The present invention relates to marzipan-like compositions containing psyllium. These compositions comprise: (a) psyllium fiber; (b) almond paste; and (c) preferably, carrier materials suitable for ingestion (preferably sugars and/or humectants and/or flavorants). Further, these compositions preferably have low water activities ("Aw"). The components for use in the present compositions, and the amounts to be utilized, are described in detail hereinafter.

(a) Psyllium Fiber

The present compositions comprise psyllium fiber. The term "psyllium fiber", as used herein, means the seed coat of psyllium seed (either intact or macerated or otherwise comminuted).

Psyllium fiber comes from psyllium seed, from plants of the Plantaoo genus. Various species such as *Plantago lanceolate*, *P. rugellii*, and *P. major*, are known. Commercial psyllium includes the French (black; *Plantago indica*), Spanish (*P. psyllium*) and Indian (blonde; *P. ovata*). Indian (blonde) psyllium is preferred for use herein.

Intact or macerated seeds can be used in the practice of this invention. However, it is typical to remove the seed coats from the rest of the seed by, for example, slight mechanical pressure, and then to use only the seed coat. In the practice of the present invention it is convenient and desirable to use macerated seed coat. The seed coat is therefore preferably removed and sanitized by methods known in the art prior to use in the present compositions. For example, the psyllium husk may be sanitized by ethylene oxide or, preferably, by superheated steam (as described in U.S. Pat. No. 4,911,889, issued Mar. 27, 1990 to Leland et al., incorporated herein by reference in its entirety). Furthermore, the psyllium fiber preferably has high purity, being about 85% to about 100% pure, and more preferably being about 95% to about 100% pure.

The compositions of the present invention comprise from about 5% to about 50% psyllium fiber, preferably from about 10% to about 30% psyllium fiber, and more preferably from about 15% to about 25% psyllium fiber, by weight of the compositions.

(b) Almond Paste:

The present invention also comprises almond paste as it is typically prepared and used in marzipan compositions. Almond paste is commercially available, being sold, for example, by Blue Diamond, Sacramento, Calif. (e.g., Blanched Almond Paste, Item Code 0787, having the ingredients: blanched almonds (58%), sugar (27.5%), water (12.5-16.5%), potassium sorbate (0.22%), natural almond oil flavoring or artificial flavoring (0.14%), and polysorbate 80 (0.003%)).

For purposes of the present invention, the almond paste should comprise at least about 10% of ground almond, preferably from about 10% to about 65% of ground almond, and more preferably from about 25% to about 60% of ground almond, by weight of the almond paste. The majority of the remaining portion of the almond paste is one or more sweetening agents, typically sugar, and typically in an amount from about 20% to about 75%, and preferably from about 20% to about 40%, by weight of the almond paste. Almond paste and marzipan compositions are described in more detail in: Sugar Confectionery and Chocolate Manufacture, by R. Lees and E.B. Jackson (Leonard Hill; copyright 1973), pages 103-105 and 337-339; and Chocolate, Cocoa, and Confectionery: Science and Technology, 2nd Edition, by B. W. Minifie, (The AVI Publishing Company, Inc.; copyright 1980), pages 442-445, the disclosures of which are incorporated herein by reference in their entirety.

Compositions of the present invention comprise from about 10% to about 50% almond paste, preferably from about 20% to about 45% almond paste, and more preferably from about 25% to about 40% almond paste, by weight of the psyllium-containing compositions.

(c) Carrier Materials Suitable for Ingestion

The compositions of the present invention may further comprise other components compatible with the psyllium and almond paste, and which are suitable for ingestion. In particular, such components must not significantly reduce the efficacy of the psyllium for the therapeutic uses described herein (especially laxation and/or cholesterol reduction). Compositions of the present invention comprise from about 0% to about 85% of one or more carrier materials suitable for ingestion, preferably from about 25% to about 70%, and more preferably from about 35% to about 60%, by weight of the compositions.

The present compositions preferably comprise a sweetening agent in addition to any sweetening agent provided as part of the almond paste. This includes water-soluble sweetening agents such as monosaccharides, disaccharides, and polysaccharides such as xylose, ribose, glucose, mannose, galactose, fructose, dextrose, sucrose, maltose, partially hydrolyzed starch or corn syrup solids and sugar alcohols such as sorbitol, xylitol, mannitol and mixtures thereof. Preferred are sugar components such as sucrose, invert sugar syrups, brown sugar, corn syrup solids, fructose, dextrose (glucose), honey, molasses, maple syrup and the li.ke. Particularly preferred sugar components are very fine particle size sucrose and/or fructose, and/or corn syrup solids, especially powdered (10X) sugar.

For purposes of the present invention, it is possible to use a non-nutritive artificial sweetener (e.g., aspartame, sold as Nutrasweet ® brand sweetener by G. D. Searle; saccharin; cyclamate) for some or all of the sweetening agent component of the carrier material. This is particularly preferred when the present composition is to be taken by persons on a restricted caloric diet, or is to be taken for extended periods of time.

Examples of artificial sweeteners include saccharin, cyclamate, acesulfame K (American Hoechst), Gem Sweet (Cumberland Packing Corp.), L-sugars (Lev-0-Cal Biospherics), Hernandulcin (University of Illinois), Alitame (Pfizer), Thaumatins, trichloro sucrose, Rebaudioside A, L-aspartyl-L-phenylalanine methyl ester, aspartyl-D-valine isopropyl ester, aspartyl amino malonates, dialkyl aspartyl aspartates, stevioside, glycyrrhizin, p-phenetylurea, 5-nitro-2-propoxyaniline and neohesperidin dihydrochalcone. The term L-aspartyl-L-phenylalanine methyl ester and methyl L-aspartyl-L-phenylalanine are used interchangeably and correspond to the compound also known as aspartame. Preferred artificial sweeteners are saccharin, cyclamate, acesulfame K, and especially aspartame.

The compositions of the present invention preferably comprise from about 1% to about 65% of such additional sweetening agents, and more preferably from about 10% to about 40% of such sweetening agents by weight of the psyllium-containing compositions.

The present compositions also preferably comprise a humectant, preferably glycerin which also provides benefits as a mixing aid and helps keep the Aw of the compositions lower. Food grade quality glycerin is commercially available. Glycerin preferably comprises from about 1% to about 20% of the present compositions, and preferably from about 3% to about 8%.

The present compositions also optionally comprise other dietary fiber, preferably insoluble dietary fiber. The term "insoluble dietary fiber", as used herein, means the water insoluble, substantially non-swellable component of fiber material safe for human ingestion which is non-digestible and non-metabolizable by humans.

A wide range of materials containing insoluble dietary fiber may be used in the present invention. Preferred are cereal brans and mixtures thereof, due to their relatively high content of insoluble dietary fiber. Also preferred is that these cereal brans comprise at least about 75% of the insoluble dietary fiber. Brans preferred include those selected from the group consisting of wheat, corn, barley, rye, oats, rice, soybean, beets, and mixtures thereof. Most preferred are oat or corn. The components of the insoluble dietary fiber from these cereal brans are known to be cellulose, hemicellulose and lignin.

Compositions of the present invention containing insoluble dietary fiber typically comprise from about 1% to about 20% of an insoluble dietary fiber, and preferably from about 5% to about 10% insoluble dietary fiber, by weight of the compositions.

Other optional components which may be included are milk products such as whole milk, skim milk, buttermilk, whey, concentrated milk product (condensed or evaporated milk), dried milk products, nonfat milk powder, dry whole milk, modified whole milk and the like, egg products, including egg whites and egg yolks, protein sources (e.g., soy protein), spices, cocoa powder, flavorants such as vanilla, salt, color additives, preservatives (preferably sorbic acid), antioxidants such as ascorbic acid and alpha-tocopherol, and the like. It is also possible to coat the psyllium-containing compositions of the present invention with a variety of coating materials. Preferred is coating the entire composition (i.e., enrobing) with from about 10% to about 30% of a coating material, preferably a confectionery coating material, by weight of the final coated psyllium-containing composition.

Furthermore, other pharmaceutical active agents may be included as desired into the composition. Such actives include, for example, sennosides, analgesics, cholesterol reduction agents, etc. A preferred optional active for inclusion in the present compositions are sennosides. Sennosides are plant-derived compounds that belong to the anthraquinone group of stimulant laxatives. Sennosides are derived from the leaves or pods of various species of the Cassia plant. Commercial sources include the species *Cassia angustifolia* (*Tinnevelly senna*) and *Cassia acutifolia* (*Cassia senna* or *Alexandria senna*). Commercially, sennosides are available as pods, leaves, or concentrates of the leaves and/or pods, and therefore, as used herein, sennoside includes not only the pure or concentrated sennoside compounds having laxative properties but also senna plant materials which have laxative properties. Frequently sold concentrates range from 20%–95% calcium sennosides. The remaining components in the concentrate also originate from the plant, or are formed during extraction. Sennosides supplied from concentrates of senna pods are preferred. Such concentrates have ranges of sennoside content typically from about 20% to about 80%. Obviously, the higher the sennoside level in such concentrates, the less concentrate needed for laxative compositions. Sennosides are also described in detail in *The Merck Index*, 10th Edition (1983), No. 8298 ("Senna") and No. 8299 ("Sennoside A&B") and in "Proceedings, First International Symposium on Senna", *Pharmacology*, 36, Suppl. 1 (Karger; 1988), incorporated by reference herein in their entirety.

The laxative compositions of the present invention may comprise a safe and effective amount of sennosides, typically from about 0.01% to about 5%, and preferably from about 0.1% to about 1% by weight of the laxative composition.

Finally, mainly for storage stability purposes, the compositions of the present invention are preferably formulated to have water activities ("Aw") in the range of about 0.25 to about 0.75. Levels above this range are generally not desirable unless consumption is to occur within a relatively short time after preparation. Levels below this range are generally perceived as giving too dry a mouthfeel. Aw is a well-known property in the art (see, for example, "Water Activity and Food" by Troller and Christian (Academic Press, N.Y.; 1978) incorporated by reference herein in its entirety) and Aw can be measured by commercially available instruments.

Methods of Treatment

The present invention also relates to a method for providing laxation and regulating bowel function for a human in need of such treatment. This method comprises administering to a human in need of such treatment a safe and effective amount of a psyllium-containing composition of the present invention. Ingestion of from about 2.5 grams to about 30 grams per day of the psyllium fiber in a composition according to the present invention is appropriate in most circumstances to produce laxation. However, this can vary with the size and condition of the patient, and such matters will, of course, be apparent to the attending physician. However, since the psyllium material is nontoxic, even higher ingestion levels can be used without undue side effects. A typical dose for laxation purposes involves administering from about 3 to about 15 grams of psyllium fiber in one dose.

The present invention further relates to methods for reducing serum cholesterol levels in humans. These methods comprise orally administering to a human in need of having a lowered blood cholesterol level a safe and effective amount of a psyllium-containing composition of the present invention. Ingestion of compositions of the present invention comprising amounts sufficient to administer from about 2.5 grams to about 30 grams per day of psyllium fiber, preferably from about 5 grams to about 15 grams, is appropriate in most circumstances. However, this can vary with the size and condition of the patient, and the patient's blood cholesterol level. Such matters will, of course, be apparent to the attending physician. However, since the psyllium material is nontoxic, even higher ingestion levels can be used without undue side effects, keeping in mind the materials herein have the hereinbefore noted laxative effect.

Treatment of the patient to reduce serum cholesterol levels comprises chronic ingestion in order to lower and maintain the lowered cholesterol levels. Daily ingestion is preferred, and a daily ingestion of from about 5 grams to about 15 grams of the psyllium fiber is most commonly used, with said ingestion preferably being at 2 or 3 regularly spaced intervals throughout the day. Again, depending on the patient's size and cholesterol level in the patient's blood, this can be varied.

The following examples further describe and demonstrate embodiments within the scope of the present invention. The examples are given solely for the purpose of illustration and are not to be construed as limitations of the present invention as many variations thereof are possible without departing from the spirit and scope.

EXAMPLE 1

A psyllium-containing composition according to the present invention is prepared having the following ingredients:

| Ingredients | Weight % |
|---|---|
| Psyllium[1] | 18.45 |
| Almond Paste[2] | 29.46 |
| Corn Syrup[3] | 13.75 |
| Powdered Sugar[4] | 12.23 |
| Glycerin | 5.94 |
| Cinnamon | 0.56 |
| Sorbic Acid | 0.11 |
| Nutmeg | 0.08 |
| Yogurt Coating[5] | 19.42 |

[1] Steam sanitized psyllium fiber (95% purity).
[2] Blanched almond paste (unflavored), by Blue Diamond (Sacramento, Calif., Item Code 0787): 58% blanched almonds, 27.5% sugar, 12.5–16.5% water, 0.22% potassium sorbate, and 0.003% polysorbate 80, without the 0.14% almond oil flavoring.
[3] 80% solids.
[4] 98% Sucrose, 2% corn starch; 10X powder.
[5] Yogurt flavored confectionery coating. Product Code 9155, by Shade Foods, Inc. (Belmont, Calif.) having an ingredients list of sugar, partially hydrogenated vegetable oil (containing one or more of the following: coconut, palm kernel, cottonseed, palm, soybean), nonfat yogurt solids, lecithin, artificial color, vanillin, and salt.

The present compositions are prepared by the following procedure. Break the almond paste into small pieces and transfer to a Sigma mixer. Premix the corn syrup with the glycerin, sorbic acid, cinnamon, and nutmeg in a separate container, and then transfer to the Sigma mixer and mix for 8 minutes. Add the powdered sugar and psyllium to the mixer and mix for 5 minutes. Scrape the blades and mixer and then mix for 2 more minutes. This composition is then transferred to the hopper of the extruder with a 10 holes die (0.25 inches × 1.5 inches; 0.64 cm × 3.8 cm), and the composition is cut into pieces of about 14.9 grams. These pieces are then enrobed with the yogurt coating composition after melting the yogurt coating in a steam jacket kettle at 110° F. (43° C.). The Aw of this composition is approximately 0.66.

Ingestion of one piece of this product provides 3.4g of psyllium effective for providing laxation benefits. The composition has very good aesthetics and mouthfeel (including very little sticking or impaction of the product on the teeth), and is very well tolerated by the gastrointestinal tract.

EXAMPLE 2

A psyllium-containing product also comprising sennosides for enhanced laxative benefits is prepared having the following ingredients.

| Ingredients | Weight % |
|---|---|
| Psyllium | 22.91 |
| Powdered Sugar | 15.19 |
| Corn Syrup | 17.00 |
| Almond Paste | 36.28 |
| Glycerin | 7.38 |
| Senna[1] | 0.31 |
| Sorbic Acid | 0.13 |
| Cinnamon | 0.70 |
| Nutmeg | 0.10 |

[1] 73.1% Sennosides A&B, supplied by Leiras Medicia, Turku, Finland.

This composition is prepared by a method similar to the procedure in Example 1 except that the senna is premixed with the glycerin (5 minutes mixing in a Hobart mixer). The product is extruded and cut into approximately 11.0 gram pieces. The product pieces are then preferably enrobed with the yogurt coating as described in Example 1 (approximately 17–20% weight gain).

Ingestion of one piece of this composition provides fast, gentle acting laxative benefits from an aesthetically acceptable and well tolerated product.

What is claimed is:

1. A composition comprising:
   (a) from about 5% to about 50% psyllium fiber;
   (b) from about 10% to about 50% almond paste; and
   (c) from about 0% to about 85% carrier materials suitable for ingestion.

2. The composition according to claim 1 wherein the almond paste comprises from about 10% to about 65% of ground almond by weight of the almond paste.

3. The composition according to claim 2 wherein the almond paste further comprises from about 20% to about 75% of one or more sweetening agents by weight of the almond paste.

4. The composition according to claim 3 comprising from about 25% to about 70% carrier materials suitable for ingestion, and wherein further said carrier materials comprise one or more ingestible materials selected from the group consisting of glycerin, sweetening agents, flavorants, preservatives, and mixtures thereof.

5. The composition according to claim 4 wherein the carrier materials comprise from about 1% to about 20% glycerin and from about 1% to about 65% of one or more sweetening agents, by weight of the composition.

6. The composition according to claim 5 having water activities within the range of from about 0.25 to about 0.75.

7. A composition comprising:
   (a) from about 10% to about 30% psyllium fiber;
   (b) from about 10% to about 45% almond paste, comprising from about 25% to about 60% ground almond by weight of the almond paste; and
   (c) from about 25% to about 70% of carrier material suitable for ingestion selected from the group consisting of glycerin, sweetening agents, flavorants, preservatives, and mixtures thereof.

8. The composition according to claim 7 comprising from about 3% to about 8% glycerin, and said composition has water activities within the range of from about 0.25 to about 0.75.

9. The composition according to claim 8 wherien the almond paste comprises from about 20% to about 40% of one or more sweetening agents, by weight of the almond paste, and wherein further the carrier material comprises from about 10% to about 40% of one or more sweetening agents, by weight of the composition.

10. A composition comprising:
(a) from about 15% to about 25% psyllium fiber;
(b) from about 10% to about 40% almond paste, wherein said almond paste comprises from about 25% to about 60% ground almond and from about 20% to about 40% of one or more sweetening agents, by weight of the almond paste;
(c) from about 3% to about 8% glycerin; and
(d) from about 35% to about 60% of carrier material suitable for ingestion selected from the group consisting of sweetening agents, flavorants, preservatives, and mixtures thereof, and wherein further said carrier material comprises from about 10% to about 40% of one or more sweetening agents by weight of the composition;

and wherein further said composition has water activities within the range of from about 0.25 to about 0.75.

11. A method for providing laxation and regulating bowel function in a human, said method comprising administering to a human in need of such treatment a safe and effective amount of a psyllium-containing composition according to claim 1.

12. A method for providing laxation and regulating bowel function in a human, said method comprising administering to a human in need of such treatment a safe and effective amount of a psyllium-containing composition according to claim 10.

* * * * *